(12) United States Patent
Unger et al.

(10) Patent No.: US 9,631,153 B2
(45) Date of Patent: Apr. 25, 2017

(54) ADAPTABLE UNIVERSAL METHOD FOR PRODUCING SYNTHETIC PRODUCTS

(76) Inventors: Reinhard Unger, Forst (DE); Andreas Unger, Forst (DE)

( * ) Notice: Subject to any disclaimer, the term of this patent is extended or adjusted under 35 U.S.C. 154(b) by 429 days.

(21) Appl. No.: 14/238,178

(22) PCT Filed: Mar. 9, 2012

(86) PCT No.: PCT/DE2012/100057
§ 371 (c)(1),
(2), (4) Date: Mar. 5, 2014

(87) PCT Pub. No.: WO2013/020549
PCT Pub. Date: Feb. 14, 2013

(65) Prior Publication Data
US 2014/0182194 A1   Jul. 3, 2014

(30) Foreign Application Priority Data

Aug. 8, 2011 (DE) .................. 10 2011 052 476
Feb. 3, 2012 (DE) .................. 10 2012 100 897

(51) Int. Cl.
*C10L 5/04* (2006.01)
*C10L 3/08* (2006.01)
(Continued)

(52) U.S. Cl.
CPC .............. *C10L 3/08* (2013.01); *B01J 8/087* (2013.01); *B01J 8/10* (2013.01); *C10B 51/00* (2013.01); *C10B 53/07* (2013.01); *C10G 1/002* (2013.01); *C10G 1/10* (2013.01); *C10K 1/04* (2013.01); *C10K 1/08* (2013.01); *C10L 5/406* (2013.01); *B01J 2219/00094* (2013.01);
(Continued)

(58) Field of Classification Search
CPC .................................. C10L 5/406; C10L 3/08
USPC ........................................ 585/240, 241, 242
See application file for complete search history.

(56) References Cited

U.S. PATENT DOCUMENTS

| 5,597,852 A * | 1/1997 | Unger ................. C08G 63/785 |
| | | 521/44 |
| 7,771,699 B2 * | 8/2010 | Adams .................... C10G 1/02 |
| | | 422/198 |

(Continued)

FOREIGN PATENT DOCUMENTS

| DE | 20001920 | 5/2000 |
| DE | 10065921 | 7/2001 |

(Continued)

OTHER PUBLICATIONS

Busch, G., Grollmann, J., Sieber, M., Burkhardt, M.: A new and sound technology for biogas from solid waste and biomass. In Water Air and Soil Pollution: Focus (2009) 9:89-97.

(Continued)

*Primary Examiner* — Ellen McAvoy
(74) *Attorney, Agent, or Firm* — Bryant J. Keller; Kirton McConkie, PC

(57) ABSTRACT

The invention relates to a method for the chemical conversion of mixtures of materials produced from solid and liquid hydrocarbons into gas/vapor mixtures and carbonaceous materials by thermal actions, catalysis and other processes and a device comprising jacket-heated, vertically and horizontally oriented reactors known per se with conveying devices and further apparatus in a process cycle.

15 Claims, 2 Drawing Sheets

Figure 1:
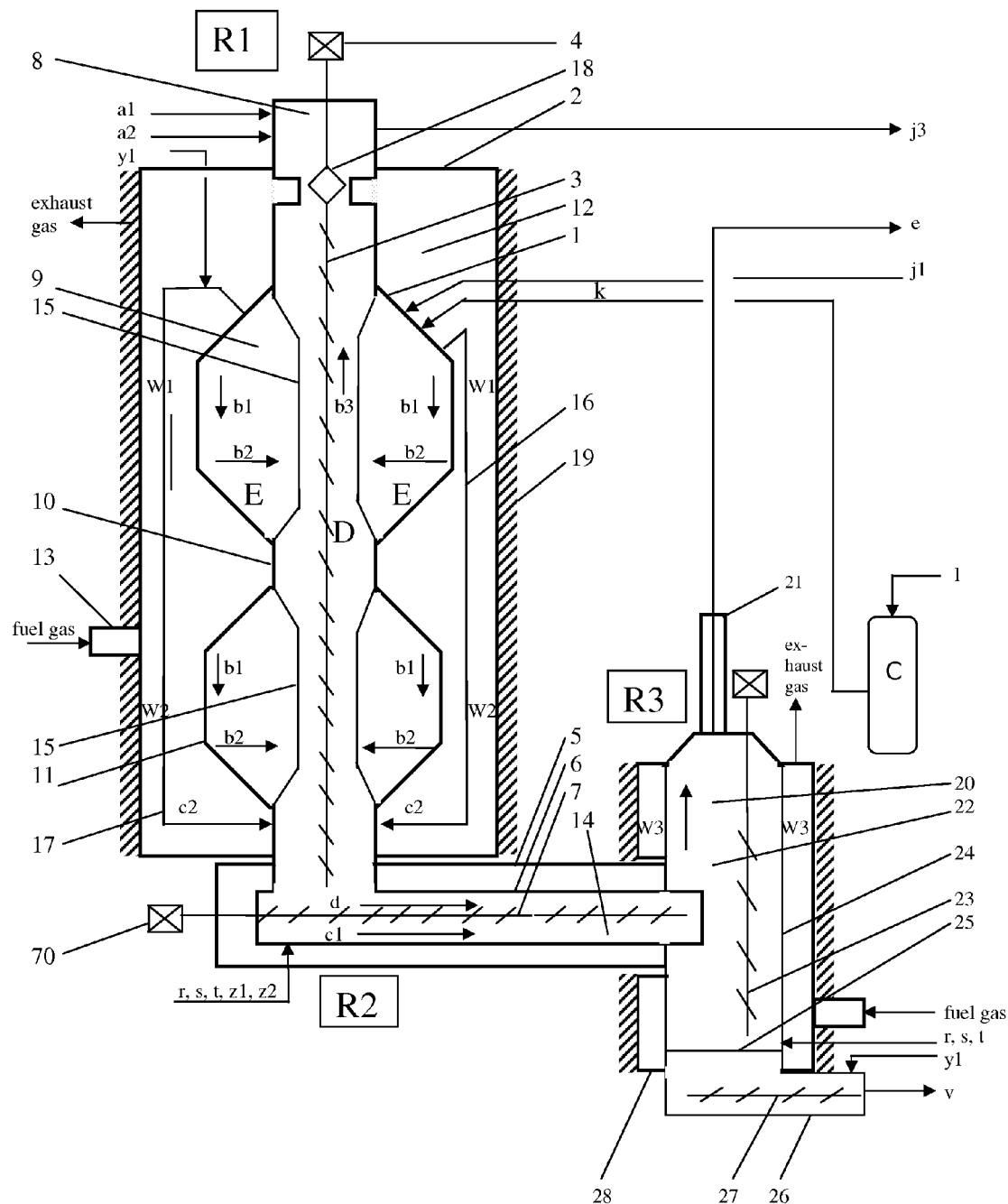

(51) Int. Cl.
- *B01J 8/10* (2006.01)
- *C10K 1/04* (2006.01)
- *C10K 1/08* (2006.01)
- *C10B 51/00* (2006.01)
- *C10B 53/07* (2006.01)
- *C10G 1/00* (2006.01)
- *C10G 1/10* (2006.01)
- *B01J 8/08* (2006.01)
- *C10L 5/40* (2006.01)

(52) U.S. Cl.
CPC ............. *B01J 2219/00157* (2013.01); *C10G 2300/807* (2013.01); *Y02E 50/30* (2013.01); *Y02P 20/143* (2015.11)

(56) References Cited

U.S. PATENT DOCUMENTS

| | | | | |
|---|---|---|---|---|
| 8,193,403 | B2* | 6/2012 | DeWhitt | C10B 47/18 201/25 |
| 8,664,458 | B2* | 3/2014 | Kumar | C10G 1/10 201/21 |
| 8,969,638 | B2* | 3/2015 | Tippet | B01J 8/062 201/25 |
| 8,980,143 | B2* | 3/2015 | Loop | B01J 3/008 210/175 |
| 9,200,207 | B2* | 12/2015 | Huang | C10G 1/002 |
| 9,234,138 | B1* | 1/2016 | Li | C10B 1/10 |
| 2006/0076224 | A1* | 4/2006 | Ku | C10B 47/44 202/99 |
| 2009/0299110 | A1* | 12/2009 | Sarker | C10G 1/10 585/14 |
| 2013/0055623 | A1* | 3/2013 | Iversen | C10G 1/086 44/385 |

FOREIGN PATENT DOCUMENTS

| | | |
|---|---|---|
| DE | 10018201 | 10/2001 |
| DE | 10033453 | 1/2002 |
| DE | 10047787 | 3/2002 |
| EP | 1312662 | 5/2003 |

OTHER PUBLICATIONS

Dahmen, N. (2007) Perspektiven der Brennstoffzelle, Workshop FZK Karlsruhe, Mar. 14, 2007.

Spiegelberg, V. (2008) Thermische Verwertung von Rest- and Abfallstoffen—ein Beitrag zum Klimaschutz. Güstrower Umweltkolloquium 2008.

* cited by examiner

ADAPTABLE UNIVERSAL METHOD FOR PRODUCING SYNTHETIC PRODUCTS

The invention relates to
a method for the chemical conversion of mixtures of substances produced from solid and liquid hydrocarbons into gas/vapour mixtures and carbonaceous mixtures of substances by thermal actions, catalysis and other processes and
a device in the form of a universal unit having adaptable equipment for special applications comprising jacket-heated, vertically and horizontally oriented reactors known per se with conveying devices and further apparatus in a known configuration with known built-in components and in a process cycle according to the invention.

Over the last 10 years, particularly under pressure from amendments to environmental legislation and the ban on the dumping of residual materials with a loss on ignition of more than 5 Ma. %, which came into effect in 2005, numerous patent applications have been made in this field.

The patents relate to high-temperature and low-temperature gasification. The gasification is conducted using biomass or waste products.

Some authors state that the medium-temperature pyrolysis and melting pyrolysis hitherto used for niche applications and for the thermal treatment of selected residual materials which are currently recyclable in energy terms is not sufficiently suitable and that it would not achieve a similar magnitude in application, such as waste incineration. Fundamental formulations are explained with regard to pyrolysis.

Pyrolysis refers to the complete thermal destruction of organic matter by substoichiometric air supply. The process requires the supply of heat energy. The general aim is that of producing a fuel in the form of pyrolysis gas.

The known methods
schwelen method with a process temperature below 500° C.,
medium-temperature pyrolysis in the temperature range 500 to 800° C.,
melting pyrolysis at temperatures of 800 to 1,500° C.
are criticised.

Depending on the selected process conditions, pyrolysis gas or tar is produced during the pyrolysis processes. The pyrolysis gas contains different components and in most methods also approx. 50% nitrogen. In downstream processes, the gas may be used to generate heat energy.

Pyrolysis is carried out in rotary reactors, in shaft reactors or in entrained-flow gasifiers, for example.

The disadvantage is that the feedstock has to be comminuted and must undergo partial combustion. The generated gas then reaches a further gas converter (cracking reactor, reactor), where higher organic components are once again degraded. The cracked gas produced in the gas converter is purified following cooling at a gas scrubbing stage (two-stage with an acid stage for the binding of $H_2SO_4$, alkaline stage with NaOH for the binding of HCl) and fed to the downstream process, if it is a process in which there is only a smaller proportion of nitrogen in the gas.

It can be established that plants which operated on the basis of the high-temperature method were not fit for purpose and are no longer in operation.

In one method, a gasification at low temperature level is deployed. An intermediate product is first produced. The resulting gas goes straight into the follow-on gas treatment system where it is purified. However, the gas mixture produced during this gasification has a high carbon dioxide value and a lower calorific value. The properties are not sufficiently controllable. In order to allow a review of known technologies, however, important preconditions must be clarified. Requirements result in relation to the feed material, on the other hand there are requirements in relation to residual process substances. A choice of technologies can therefore only be seen within the overall context of a plant of this kind (Keldenich and Mrotzek, 2005; Dahmen, 2007; Spiegelberg, 2008; Bush et al., 2009). The authors also provide a basic overview of technologies and criticise fixed bed and fluidised bed technology retrospectively.

Shaft reactors and fixed-bed gasification (examples: Lurgi, MFU, Gatzke, Kupol, 2SV) are referred to by way of example. Gasification takes place here with the introduction of air. High temperatures are set in order to implement the method. A lean gas is produced due to the nature of the process. Typically, oxygen must be introduced. The addition of lignite is also a prerequisite for this method. The loaded waste material must also be pelletized. Since most of these plants work under pressure, correspondingly high expenditure in terms of material feed equipment is required (equipping with sluice tanks, use of nitrogen for flushing purposes in the sluice tanks, discontinuity of feed). The slag is discharged via special devices in liquid form into water-filled tanks. The impracticability of guaranteeing temperature control and the observance of continuous gas production are criticized.

The rotary drum reactor is designed to run at temperatures of between 400 and 600° C. However, only a low-calorific, poorly usable gas is produced due to the short-circuit flows.

In a process with an entrained-flow gasifier, solid substances, liquid sludge, gas and oxygen introduced. The material has to be atomized and combusted partly at high temperatures in free fall. A lean gas is produced consisting of carbon oxides and hydrogen. The material particles must be fine enough for the free fall time to be sufficient to gasify it. The gas is quenched with water and the resulting slag falls in droplets into the water-filled sump. The reaction usually takes place at 1600° C. and under pressure. One feature of the method is a cooled combustion chamber pipe in the closed vertical reactor. The process makes certain requirements of the properties of the material being loaded.

In a process involving a horizontal reactor with an agitated fixed bed (Choren Freiberg), the material is fed in via a plurality of isolated sluice tanks with clearing equipment and nitrogen blanketing with pressure equalization for charging a horizontal heated reactor with a rotor and overflow of the partially gasified product. The charging and delivery of the material takes place via screw apparatus. Heating takes place through partial combustion of the material with oxygen. The material is introduced into the partially gasified fill and agitated. The temperature of this stage is around 550° C., the working pressure around 5 bar. The process proved to be too prone to faults.

Furthermore, patents belonging to the state of the art are disclosed:
DE 100 47 787
  "Method of producing fuel gas from household rubbish and similar waste by pyrolysis with downstream conversion of the pyrolysis products low-temperature carbonization gas and semi-coke into permanent gas"
DE 100 33 453
  "Method and device for the pyrolysis and gasification of substance mixtures containing organic components"
DE 100 65 921
  "Method and device for the gasification of fuel, residual and waste materials with pre-evaporation"

DE 200 01 920

"Device for the gasification of carbonaceous solids"

DE 100 18 201

"Pyrolytic furnace for the thermal splitting of hydrocarbons"

The disadvantage of the state of the art referred to or the existing patents is that only gases with comparatively low calorific values can be produced using the processes described. This is particularly due to the fact that the methods are based on the principle of the partial combustion of synthetic waste and other waste. This produces a lack of uniformity, a lower calorific value, an irregularity of composition, disadvantages in terms of gas quality, a noxious substance burden and greater requirements in terms of material preparation.

The object of the invention is to create a universal method for the production of synthetic products.

The problem addressed by the invention is that of achieving a universal method capable of adoptable design for the production of synthetic products, which method can be adapted at little expense to site requirements emerging from material and product needs, in order to implement the process. The need for adaptability to the widely diverging material properties requires a method and also features of the device allowing flexible process control. This is achieved in that the process is carried out in a sequence of modules connected consecutively or in cycles, which can be changed within the framework of the process features described and replaced according to need. By means of method-specific coupling processes, adaptation of the process sequence is achieved during modification of a module.

The invention is described below as a method and a device, wherein patent claims 1 and 2 are realized.

The method for the chemical conversion of mixtures of substances produced from solid and liquid hydrocarbons into gas/vapour mixtures and carbonaceous materials through thermal actions, catalysis and method-related processes is developed in such a manner that in process sequence "A", comprising processes in the main reactor, in the conversion section, in the secondary reactor and in the cracking reactor, the chemical conversion of substances, and in process sequence "B", comprising oil capture and conditioning processes, the capture of noxious substance components, char/oil capture and separation, gas scrubbing, circulation evaporation, the mixing and capture of substances, are carried out, in which in process sequence "A" hydrocarbons undergo a multistage depolymerisation and cracking reaction in the main reactor and also the subsequent gas/vapour reactions in the conversion section and in the secondary reactor and in process sequence "B" the substances produced undergo fractionated condensation, purification, separation, evaporation, mixing and conditioning, wherein components produced are conducted through processes of one or both process sequences in the cycle;

hydrocarbons fed as an anisotropic material mixture, in the form of a fill into process sequence "A" undergo a depolymerisation and cracking reaction in the main reactor and a subsequent equilibrium reaction in the conversion section and in the secondary reactor, into which fill carbonaceous mixtures, permanent gases, steam, carbon oxide-containing vapour mixtures and organic vapour components are introduced as the mass flow, as a result of which, under the effect of indirectly fed heat in conjunction with the addition of oil-soluble substances and oil from process sequence "B", a product gas and carbon are produced;

the produced anisotropic mixture consisting of particles is mechanically separated, so that in an indirectly heated ring zone, in which under the effect of the cracking reaction taking place predominantly on the particle surface evaporation takes place on the constituents of the anisotropic mixture in the downwardly directed material flow, producing a concentrically directed material flow with a high transported energy quantity, and in an upwardly conveyed mass flow in the core zone which is heated by heated particles of the fill and at the same time also indirectly heated by heat transfer and compressed and relaxed in a pulsating manner, in which core zone carbon is entrained, predominantly to allow depolymerisation to take place, while the gas/vapour mixture produced in the zones by cracking, evaporation and gas reaction with the feeding and mixing of oil-soluble substances along with the mass flow bridging the process in the ring zone, which has been raised to a high temperature, is introduced into the material flow of the high-temperature char bed inserted into process sequence "A", in which an equilibrium reaction is then carried out in the conversion section with the addition of further oil-soluble substances with noxious substances contained therein, which occur in the downstream process sequence "B" from separation processes with oil separation, char/water separation and the separation and evaporation process in the circulation evaporator;

a low-boiling component conducted via the separating and evaporation process in the circulation evaporator and a catalytic cracking process in the cracking reactor from the separating process in the char/oil separator is fed as a mass flow to the ring zone and therefore to the downwardly directed material flow and is chemically converted;

the partially converted substances are fed with the downwardly directed material flow of the equilibrium reaction in the conversion in the conversion section to the mass flow of the char bed, so that under the effect of the char bed and the components involved, a gas/vapour mixture with fractions of hydrocarbons in vapour form can be produced, which mixture is fed to the secondary reaction process in the secondary reactor and subjected to a gas equilibrium reaction therein and which mixture within the produced raw gas is fed as a gas flow to the gas scrubbers in process sequence "B" were the mixture with the conditioned mass flows or gas flows and vapour components as the gas/vapour mixture containing noxious substances undergoes fractionated condensation, with the temperature of the scrubbing media in the scrubbers set by the circulating mass flow, by the supplied mass flow and by heat transfer, the pressure pulsation in the core zone of the process in the main reactor is achieved by an upwardly conveyed mass flow and intensified by the evaporation process of the ring zone and also by the low-boiling component of the separating process in the char/oil separator fed via the catalytic cracking process, as a result of which the evaporation speed on the particle surface of the anisotropic mixture is increased;

the gas reaction in the gas/vapour mixture is carried out in a plurality of reaction zones arranged in a cascade, such as the conversion section and secondary reactor, with the char bed and the conveyed material flow with the addition of permanent gases, oil-soluble substances and steam for gas production, for the chemical conversion of oil-soluble noxious substances and for the chemical conversion of high-boiling hydrocarbons and a gas reaction is carried out as a reduction process;

the separating process in the char/oil separator is carried out and in that through heating of the upper separator zone and simultaneous horizontal conveyance of the media in the lower separator zone under the effect of gravitation and the different solubility of substances of the condensed components in a mass flow coming from the gas scrubber with a heavy oil component being part of this mass flow and char particles also entrained and a mass flow of an aqueous component with water-soluble noxious substances contained therein and oil contained therein and oil-soluble noxious substances are mixed together, dissolved in one another and then separated by controlling the media quantities and also producing and setting a phase boundary, in such a manner that the low-boiling oil component, the oil component heavier than water with the oil-soluble substances dissolved therein and a mixture of water with water-soluble noxious substances and carbon, are separated from one another and discharged, wherein the water absorbs salts during this, is drained off and then introduced into the gas scrubber separately from the solid component, while the solid carbon component is fed as a suspension following separation of part of the aqueous component of water with noxious substances to the anisotropic mixture and is conducted back into the reaction in the reactor;

as a result of the separation process in the char/oil separator, the hydrocarbon component is dechlorinated and the heavy hydrocarbon component fed from the gas scrubber with a density greater than or equal to water, which contains char dust as the solid, and a light oil component fed from the process sequence, which is lighter than water and in which noxious substances and solubilizers for oil and water in the form of quinoid and phenolic systems are contained, are mixed and fed to the reaction process in the secondary reactor for chemical reduction of the solubilizers;

a distillation process for hydrocarbon components is integrated in the process sequence, which hydrocarbon components are channelled off for use;

in the upper region of the main reactor dechlorination takes place at temperatures <500° C. and the resulting vapours are channelled off together in the steam as vapour containing noxious substances into the gas scrubbing;

a carbon-containing mixture is produced in the char/oil separator and fed into the depolymerisation process in the main reactor as the reduction component.

A device comprising jacket-heated, vertically and horizontally disposed reactors known per se with conveying devices and further apparatus in a known configuration with known built-in components and in a process cycle is developed in such a manner that the vertical main reactor in the region of the high-temperature zone exhibits a cross-sectional reduction and a subsequent cross-sectional enlargement, so that arranged between these is a pipe section connecting the lower and the upper reactor part, through which pipe section an eccentrically mounted vertical screw located in both reactor parts passes, which screw is surrounded in both reactor parts by a register of pipes in each case, which register divides the reaction space into zones and is connected to the jacket heating chamber, a further pipe register of the main reactor, which is connected to both reactor parts and is located on the outside in the heating jacket chamber bridges both reactor parts, the upper chamber of the main reactor is divided into an outer region and an inner region in the upper part by a U-shaped, downwardly open sheet and that the material supply connection nozzle of the main reactor is arranged in such a manner that it is connected to the upper part of the inner region, the media connection nozzle of the mass flow coming from the cracking reactor and the media connection nozzle for the carbonaceous mixture from the separator is connected to the upper reactor part and the media connection nozzle of the pipe from the char/oil separator and the circulation evaporator to the lower reactor part, in the upper reactor part of the main reactor, a dechlorination zone is arranged, which has a media connection nozzle for feeding an anisotropic material mixture and a media connection nozzle for channeling off the vapour containing noxious substances, a horizontal reactor with an integrated screw, conversion section and one or a plurality of secondary reactors are connected downstream of the lower reactor part of the main reactor, the char/oil separator is a chambered tank with a rotating screw disposed beneath all chambers, which separator is heated in the upper zone, equipped with an agitator in one of the middle chambers and has overflows between the chambers and to the media connections on the apparatus wall, wherein the heights of the overflows are arranged in a rising height configuration in the direction of the connection nozzle of the line coming from the gas scrubbing, the char/oil separator is connected to at least one gas scrubber and a separator of a second gas scrubber and apparatus functionally assigned in a process-related manner via media lines.

The method and the device are described and explained below based on exemplary embodiments according to FIG. 1 Process sequence "A"

Figure 2:
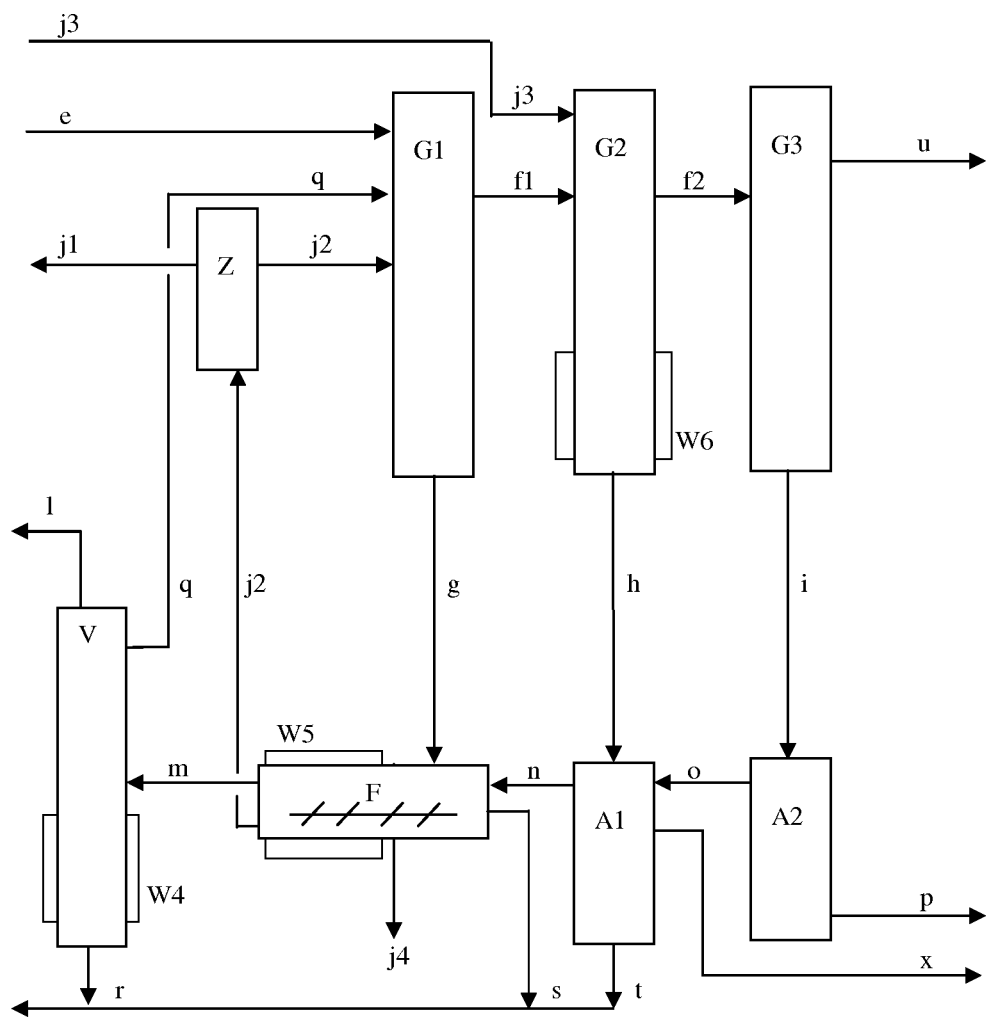

FIG. 2 Process sequence "B".

The method for the chemical conversion of mixtures of materials produced from solid and liquid hydrocarbons into gas/vapour mixtures and carbonaceous mixtures of materials by thermal actions, catalysis and method-related processes is configured in such a manner that in process sequence "A", consisting of the processes in the main reactor, in the conversion section, in the secondary reactor and in the cracking reactor, the chemical conversion of materials and in process sequence "B", consisting of the processes of oil capture and conditioning, capture of noxious substance components, char/oil capture and separation, gas scrubbing, circulation evaporation, the mixing and separation of substances are carried out, in that in process "A" hydrocarbons are subjected to a multistage depolymerisation and cracking reaction in the main reactor and also to the following gas/vapour reactions in the conversion section and in the secondary reactor and in process sequence "B" the produced substances undergo fractionated condensation, purification, separation, evaporation, mixing and conditioning and components produced are conducted through processes of one or both process sequences in cycles, wherein hydrocarbons fed to process sequence "A" as an anisotropic material mixture undergo a depolymerisation and cracking reaction and then an equilibrium reaction, into which reaction carbonaceous mixtures, permanent gases, steam, carbon oxide-containing vapour mixtures and organic vapour components are introduced, as a result of which, under the effect of indirectly supplied heat in conjunction with the supply of oil-soluble substances and oil from process sequence "B", a product gas and carbon are produced, for which purpose the anisotropic mixture mixed with the material flow is fed to an indirectly heated ring zone, in which under the effect of the cracking reaction taking place predominantly on the particle surface in the downwardly directed material flow, evaporation takes place producing a concentrically directed material flow with a high transported energy quantity, so that depolymerisation takes place primarily in the upwardly conveyed material flow in the core zone which is heated by heated particles of the fill and at the same time also indirectly heated by heat transfer and compressed and relaxed in a pulsating manner, in which core zone carbon is entrained, while the gas/vapour mixture produced in the zones by cracking, evaporation and gas reaction is introduced into the high-temperature char bed of the material flow with the feed and mixing of the material flows along with the material flow bridging the process in the ring zone, which material flow has been raised to a high temperature, in which char bed an equilibrium reaction is then carried out with the addition of further oil-soluble substances with noxious substances contained therein, which accumulate from separating processes in the downstream process sequence "B", and a low-boiling component produced in various processes and in the catalytic cracking process as mass flow is fed to the ring zone and therefore to the downwardly directed material flow and is chemically converted, in the core region of the process in the main reactor a pressure pulsation is triggered by the upwardly directed material flow and by the supply of the low-boiling component, in order to increase the evaporation speed on the particles in the ring zone, the reaction of the gas/vapour mixture in conjunction with the char of the conveyed material flow with the supply of permanent gases, oil-soluble substances and steam from process sequence "B" is carried out for gas production and the gas reaction is carried out as a reduction process, and implementation of the separating process in process sequence "B" by heating the upper separating zone with simultaneous horizontal conveyance of the media in the lower separating zone and production of the material flows of low-boiling oil components, oil components heavier than water and water with water-soluble noxious substances and carbon, in conjunction with control of the media quantities and setting of a phase boundary for recovery of the oil components with noxious substances and solubilizers, which contain quinoid and phenolic systems, the hydrocarbon components are dechlorinated and liberated of char dust.

The method is furthermore developed in such a manner that in process sequence "A" according to FIG. 1 the reaction processes
    cracking and depolymerisation reaction,
    conversion and catalytic reaction,
    equilibrium reaction and water-gas shift reaction,
    catalytic reaction with mineral compounds
are carried out in consecutive and partially overlapping reaction processes in the main reactor R1, the conversion section R2/14, the secondary reactor R3 and the cracking reactor C for the chemical conversion of substances, in which a multistage depolymerisation and cracking reaction is initially carried out for the cracking of high-molecular materials, such as plastics, and for the splitting off of small molecules, in order to produce material flows with defined properties which can be converted in the subsequent reaction, that a process is then carried out with gas/vapour reactions in the conversion section R2/14, in order to achieve both a reduction and also methanisation, in order subsequently to subject the substances produced with steam and carbon to a further gas/vapour equilibrium reaction in the secondary reactor R3, by means of which a defined gas mixture is produced through the process features of the chemical reaction carried out, and in process sequence "B" according to FIG. 2 the substances produced undergo fractionated condensation, purification, separation, evaporation and mixing and certain produced components are thereby conducted in the cycle through processes of one or both process sequences, in order to separate off, replace and discharge noxious substances, in order to avoid enrichment in the cycle, that in process sequence "B" according to FIG. 2, comprising the processes
    oil separator A1
    water with minerals separator A2
    char/oil separator F
    gas scrubber G1
    gas scrubber G2
    gas scrubber G3
    process in the circulation evaporator V
    separator Z
the separation, mixing and capture of substances is carried out.

In process sequence "A" an anisotropic material mixture a1 in the form of a fill is fed into a carbonaceous mixture, in addition
    steam y1,
    carbon oxide-containing vapour mixtures z2,
    permanent gases z1,
    carbonaceous mixture j1,
    oil-soluble substances r, s, t,
    organic vapour components k,
    oil x,
    carbon v and
    product gas mixture u
are introduced at the points according to the invention, and undergo an indirect heating by the heat modules W1, W2, W3 in the heating process, the anisotropic mixture produced from particles is mechanically separated and the downwardly directed material flow b1 undergoes indirect heating in the ring zone E, in which under the effect of the cracking reaction and evaporation taking place predominantly on the particle surface of the anisotropic mixture in the downwardly directed material flow b1, taking place combined with the production of a concentrically directed material flow b2, a high energy quantity per unit area passes into the core zone, and the upwardly conveyed mass flow b3 of the core zone, in which depolymerisation D takes place primarily, is heated with previously heated particles and with simultaneous indirect heat transfer through the inner register 15 and compressed and relaxed in a pulsating manner, the downwardly directed mass flow b1 and the mass flow c2, which is conducted via the outer register, in which an indirect heat supply takes place via the heat module W1, are mixed, wherein the mass flow c2 bridges the depolymerisation process, the gas/vapour mixture d produced in the zones—by cracking, evaporation and gas reaction—is introduced as the mass flow into the conversion process in the conversion section R2/14, that the substances of the downwardly directed material flow b1 and of the mass flow c2 are fed into the equilibrium reaction in the conversion section R2/14 to the conveyed material flow with carbon c1 of the char bed, in the conveyed material flow with carbon c1 in a produced high-temperature char bed an equilibrium reaction is carried out with heating in heat module W2, oil-soluble substances r, s, t with noxious substances contained therein are introduced in this char bed, which substances are fed from the separating processes oil separator A1 and the char/oil separator F and the separating and evaporation process in the circulation evaporator V, a low-boiling component m conducted via the separating and evaporation process in the circulation evaporator V and a catalytic cracking process in the cracking reactor C is fed from the char/oil separator F as the organic vapour component k into the ring zone E and therefore to the downwardly directed material flow b1 and is chemically converted, the gas reaction in the gas/vapour mixture d in a plurality of reaction zones arranged in a cascade in the conversion section R2/14 and in the secondary reaction in the char bed with the conveyed material flow with carbon c1 with the addition of permanent gases z1, oil-soluble substances r, s, t and noxious substances and steam y1 as oxygen suppliers for gas production, for the chemical conversion of oil-soluble noxious substances and for the chemical conversion of high-boiling hydrocarbons and a gas reaction is conducted, so that in the char bed of the reaction zones in the conversion section R2/14 and in the secondary reactor R3 the gas flows e are produced with fractions of vaporous hydrocarbons from the components of the gas/vapour mixture d, which are fed to the gas scrubbers G1, G2, G3 of process sequence "B", in which the gas flows e, f1, f2 are scrubbed and the vapour components undergo fractionated condensation by setting the temperature of the scrubbing media of the scrubbers, which is undertaken through the material flow overflow q and the heat dissipation in the heat module W5, the low-boiling component m from the separation process in the char/oil separator F is conducted via the catalytic cracking process in the cracking reactor C and fed as organic vapour component k into the ring zone E of the main reactor R1 to increase the evaporation speed on the particle surface of the anisotropic material mixture a1, the separating process in the char/oil separator F through heating in the heat module W5 of the upper separator zone and simultaneous horizontal conveyance of media in the lower separator zone under the effect of gravitation and the differing solubility of substances in the condensed components g from the gas scrubber G1 with a heavy oil component and an entrained char component and the mass flow with water-soluble noxious substances n of an aqueous component with oil x contained therein and oil-soluble noxious substances are mixed together, dissolved in one another and then separated by controlling the media quantities and also producing and setting a phase boundary, in such a manner that the mass flows oil x as the low-boiling component m, "oil x heavy" dissolved in "oil x light" with noxious substances and char suspension as the oil-soluble substance s and water with char as the carbonaceous mixture j2 and water with noxious substances and carbon j4, are separated from one another and discharged, wherein the water absorbs salts, is drained off and then introduced separately from the solid component into the gas scrubber G1, the solid component is fed as a carbonaceous mixture j1 to the anisotropic material mixture a1 and the liquid organic components are conducted back into the reaction in the secondary reactor R3 as oil-soluble substances s, that through the separating process in the char/oil separator F, the hydrocarbon component is dechlorinated and the heavy hydrocarbon component fed from the gas scrubber G1 with a density of water, which contains char dust as the solid, and a light oil component fed from process sequence "B", which is lighter than water and in which noxious substances and solubilizers for oil x and water in the form of quinoid and phenolic systems are contained, are mixed and fed to the reaction process in the secondary reactor R3, that a distillation process for hydrocarbon components is integrated in process sequence "B", which components are channeled off for use, that in the upper region of the core zone at temperatures below 500° C. and under the conditions, dechlorination takes place and the vapours thereby produced jointly in the steam y1 are discharged into the gas scrubbing.

The device is described in greater detail.

Gas production comprises the main reactor with conversion R1, R2 and the secondary reactors R3 and peripheral equipment.

In the main reactor R1 the partial chemical conversion of the fed input material into gaseous and vaporous hydrocarbons takes place. For this purpose, cracking, depolymerisation and gas reactions are carried out in the main reactor.

The main reactor R1 comprises a chambered reactor wall 1, a heating jacket 2, a built-in screw agitator 3 with support stand 4 and a horizontally inclined conversion section R2/14 with reactor wall 6, heating jacket 5 and screw 7 with support stand 70 attached to the lower high-temperature chamber 11, wherein the conversion section R2/14 is inclined.

The main reactor R1 consists of the following components:

input region 8 with distributor 18
reactor mixing chamber 9
high-temperature region 10
high-temperature chamber 11
heating jacket chamber 12 with burners 13
conversion section R2/14
inner register 15
heat transfer register 16.

The main reactor R1 has a support stand 4 mounted concentrically on the top cover for the screw agitator 3 drive and furthermore a number of inputs for material flows. The entire reactor wall 1 consisting of the reactor chambers is jacket-heated 2.

The reactor mixing chamber 9 and the high-temperature chamber 11 are conical and divided by the high-temperature region 10 thereby formed. In each chamber there is an inner register 15 for heat transfer which is connected to the heat module W1. Hot exhaust gas is conducted through this. The reactor mixing chambers 9 are bridged by a heat transfer register 16 guiding through the heating jacket chamber 12, which register is connected to the reactor chambers. Using this, product gas is conducted from the upper region of the main reactor into the conversion section R2/14 and heated. The high-temperature chamber 11 and heat transfer register 16 open out into the horizontally inclined conversion section R2/14. The reactor mixing chambers 9 are surrounded by the heat module W1, which is equipped with burners 13. The built-in screw agitators 3 are supported with a continuous shaft in the respective support stand 4 and at the opposite end.

The main reactor has inputs for the supply of hydrocarbons, permanent gas z1 and carbon oxide-containing vapour mixtures z2, and for the supply of organic vapour components k from the cracker system. The main reactor also has an nozzle for vapour containing noxious substances j3 for the removal of steam from the input region 8 via a line into the second gas scrubber G2. The main reactor is surrounded by an insulting jacket 19.

The material feed is described below. The input material from the equipment upstream, for example a screw conveyor, is introduced into the input region 8 of the main reactor R1. It falls through this into the reactor mixing chamber 9. In the reactor mixing chamber 9, high-temperature region 10 and high-temperature chamber 11 zones, the material is in a continuous exchange with a stationary reaction. A downwardly directed material flow b1 is conveyed in the ring zone E into the high-temperature zone, an upwardly conveyed mass flow b3 is conveyed upwards by the screw agitator 3 during depolymerisation D in the mixing chamber for mixing with the material from the input region 8. The timing of the screw rotation brings about a continuous pressure change and in connection with the concentrically directed material flow b2, using the material as a heat carrier, the conducting of the reaction in the core region of the reactor mixing chamber 9. The speed and timing of the screw rotation in this case brings about the adjustment of the reaction process to the changing properties of the material, such as particle size, material differences, differences in gasification speed.

The contour of the reactor wall 1, and the inner register 15 and the burner 13 cause maximum intensification of the passing energy quantity per unit area of the concentrically directed material flow b2. The high-temperature chamber 11 creates an adequate volume through an increase in cross-section and therefore an adequate material dwell time, so that the cracking reaction can take place and the gas equilibrium reaction can be initiated.

In the horizontal conversion section R2/14, the already partially converted material flow is conveyed on. In this reaction area, the equilibrium reaction is conducted as gas reaction and conversion reaction in a char bed by the reduction of hydrocarbons. The degree of material conversion increases during this. The material in this zone is conveyed bidirectionally by a screw 7 with a drive system. The remaining solid material flow reaches the secondary reactor R3 via the discharge connection nozzle of the conversion section R2/14.

The gas conveyance takes place as follows.

Various chemical reactions take place in the different zones of the main reactor R1 on account of the different process parameters and the different conversion degree of the material mixture. In order to produce a uniform gas quality that satisfies requirements, the gas is conducted out of the upper vertical zones via the heat transfer register 16, heated, collected again and fed to the conversion section R2/14. The gas originating in the upper zone takes part in the conversion reaction in the char bed present in the conversion section R2/14. The entire gas flow then passes likewise via the discharge connection nozzle into the secondary reactor R3.

The pressure in the reactor is held constant within a pressure range by an actuator in the region of the gas purification process in the gas scrubber G3.

The cracking of hydrocarbons in the cracking reactor C takes place in the following manner.

The cracking reactor C is a tubular, encased, heated apparatus, in which a catalyst fill is located. This is made up of zeolites. An oil-containing vapour 1 of low-boiling hydrocarbons, particularly mixed with aromatic molecules from the circulation evaporator V, is fed to the cracking reactor C, which hydrocarbons were produced in the plant. The hydrocarbons, particularly low-boiling hydrocarbons, are heated and partially chemically converted in the cracking reactor C for the cracking of aromatic molecules, in order to be fed into the upper ring zone E of the reactor mixing chamber 9 of the main reactor R1 as the gasification agent (organic vapour component k) to bring about a gas vapour reaction. The hydrocarbons are reduced in the gas vapour mixture d in the solid fill of the reactor mixing chamber 9 with carbon particles which are entrained here. The controlled supply of the organic vapour component k as the gasification agent thereby brings about the control of the reaction and with it the quantity of gas produced.

The secondary reactors are described in greater detail below.

In the secondary reactors R3, the chemical conversion of the hydrocarbons thereby being reduced takes place through the backmixing of the reactor content and supply of further components, which hydrocarbons are fed from the apparatus upstream. The dwell time also means that a complete conversion of solid particles of the material takes place. The complete raw gas introduced from the main reactor R1 also flows through the reactor content or the char bed of the high-temperature zone of the vertical secondary reactors R3. The reaction time for the conversion reaction is thereby increased and a bypass flow of the raw gas is prevented by the design of the reactors.

The secondary reactor R3 comprises the apparatus parts:
Gas compartment 20 with dome 21
High-temperature chamber 22 with vertical conveying device 23
Inner register 25 and outer register 24
Conversion section 26 with conveyor device 27
Heating jacket chamber and combustion chamber 28.

The gas compartment 20 and high-temperature chamber are arranged in the vertical part of the secondary reactor R3. The conversion section 26 is arranged in the inclined horizontal part beneath the high-temperature chamber 22. The heating jacket 5 surrounds the reaction chambers. The high-temperature chamber 22 is configured as a conical section. The screw 7 of the conversion section R2/14 extends through the gas compartment 20 of the secondary reactor R3.

The apparatus parts of the secondary reactor R3 are surrounded by a heating jacket chamber with a combustion chamber 28, which is equipped with burners 13. It has an inner register 15, which is connected to the heating jacket compartment and the combustion chamber 28. Hot exhaust gas is conducted through said register. The register is used for reaction control and to increase the heat transfer surface.

The high-temperature chamber 22 is arranged beneath the gas compartment 20 and configured as a cylindrical section. The high-temperature chamber 22 and outer register 24 open out into the horizontally inclined conversion section 26. The built-in conveying device 27 is connected to the shaft of the drive system and supported. The secondary reactor R3 has an input for the feeding of components from process sequence "B".

The gas conveyance in the secondary reactors R3 is configured as follows. The raw gas firstly moves from the conversion section R2/14 of the main reactor R1 into the high-temperature chamber 22 of the secondary reactor R3. The second partial volume of raw gas is produced by chemical conversion in the secondary reactor R3 with the addition of steam y1 and oil-soluble materials r, s, t. The total volume of gas flows via the gas compartment 20 and the dome 21 of the secondary reactor R3 into the first gas scrubber G1 of process sequence "B".

Process sequence "B" comprises the gas scrubbers G1, G2, G3, the oil separator A1 and the separator A2, the separator Z, the circulation evaporator V and the char/oil separator F.

The char/oil separator F is a gravity separator, in which liquid components are removed at different levels. The char/oil separator F is chambered in multiple sections and provided with built-in components. On the floor of the char/oil separator F, a screw continuously discharges the solid phase as it settles.

The media conveyance is described below.

Two partial flows are channelled from the gas scrubber G1 and fed to the char/oil separator F. Oils x and low-boiling components are captured in this first.

Following the capture of the low-boiling components m and the mixing of water with noxious substances and carbon j2, the medium remaining in the middle chamber of the char/oil separator F substantially comprises water. This is channeled off as water with noxious substances j4. The water with noxious substances and carbon j2 is fed to the gas scrubber G1 via a separator Z. the low-boiling component m goes into the circulation evaporator V. Various partial flows are removed from the circulation evaporator V. The lighter components pass into the cracking reactor C. The heavier components are fed to the conversion sections R2/14 of the main reactor R1 and of the secondary reactor R3 with permanent gases z1 and oil-soluble substances r and further converted in the char bed there.

The raw gas is introduced as a gas flow e into the gas scrubber G1 and further on into the gas scrubbers G2 and G3 and purified. Said gas scrubbers are used to separate tars, oils and char from the product gas flow and also to cool the product gas flow to below 150° C. They are further used to capture the remaining aliphates and also noxious substances from the product gas flow. Each scrubber is flowed through by the liquid media produced. The substance exchange takes place through the two-phase flow.

Oil capture A1 and capture A2 are integrated into the gas purification and separate organic constituents from the scrubber medium.

Furthermore, two sample applications of the plant are described.

EXAMPLE 1

Implementation of the method comprising a process sequence "A", with the feeding of an anisotropic mixture of 30% waste plastic, 30% waste rubber, 10% mixed construction waste and 10% mineral substances with 20% water, implementation of a depolymerisation and cracking reaction and an equilibrium reaction thereafter, wherein a conversion of 55% of the material fractions capable of conversion is achieved, so that the downstream equilibrium process and the gas/vapour reaction process is brought to a conversion of <30% of the vaporous fractions. For this purpose, gas mixtures containing hydrogen, for example steam y1, and organic vapour components k are introduced into the carbons as mass flow. The processes are carried out under the effect of indirect heating 21 in the heat modules W1, W2, W3. In addition, the components occurring in the form of oil-soluble substances r, s, t from process sequence "B" are supplied. Using the method, a 48% product gas mixture u, 12% aromatics-containing organic liquids oil x and 25% carbon v are produced. The remainder is waste water p.

EXAMPLE 2

Implementation of the method in which the produced anisotropic mixture consisting of particles is mechanically separated in such a manner that in the indirectly heated ring zone E, in which under the effect of the cracking reaction taking place predominantly on the particle surface of the anisotropic mixture, evaporation of 40% of the mixture takes place in the downwardly directed material flow b1, producing a concentrically directed material flow b2, and under the effect of this concentrically directed material flow b2 with a calculated passing energy quantity of 45 kWh/m$^2$ through the jacket surface, in the heated fill (620° C.) with simultaneous pulsation of 60 pulses/hr of the compressed and relaxed core zone originated by the screw agitator 3, a product gas is produced which exhibits a high methane fraction of 30 to 32% and, at the same time, a hydrogen fraction of approx. 25% after the gas purification process in process sequence "B". The bridging mass flow c2 in this case displays a temperature of 850° C. through indirect heating W3.

The analyses of the gas composition are indicated as follows by way of example:

| Sample gas analyses [% by vol.] | | | |
| --- | --- | --- | --- |
| Constituent | Analysis 1 | Analysis 2 | Analysis 3 |
| CH4 | 30.400% by vol. | 32.547% by vol. | 30.199% by vol. |
| C2H6 | 7.500% by vol. | 7.758% by vol. | 7.087% by vol. |
| C2H4 | 6.400% by vol. | 6.620% by vol. | 5.996% by vol. |
| C3H8 | 1.200% by vol. | 1.241% by vol. | 1.199% by vol. |
| C4H10 (i-But) | 0.100% by vol. | 0.103% by vol. | 0.164% by vol. |
| C4H10 (n-But) | 0.060% by vol. | 0.062% by vol. | 0.076% by vol. |
| CO | 13.200% by vol. | 12.550% by vol. | 13.192% by vol. |
| CO2 | 12.100% by vol. | 12.928% by vol. | 12.000% by vol. |
| H2 | 24.600% by vol. | 25.033% by vol. | 27.902% by vol. |
| O2 | 0.200% by vol. | 0.210% by vol. | 0.270% by vol. |
| N2 | 1.100% by vol. | 1.138% by vol. | 1.477% by vol. |

REFERENCE NUMBERS

1 Reactor wall
2 Heating jacket
3 Screw agitator
4 Support stand
5 Heating jacket
6 Reactor wall
7 Screw
8 Input region
9 Reactor mixing chamber
10 High-temperature region
11 High-temperature chamber
12 Heating jacket chamber
13 Burner
15 Inner register
16 Heat transfer register
17 Joint
19 Insulating jacket
20 Gas compartment
21 Dome 22 High-temperature chamber
23 Conveying device
24 Outer register
25 Inner register
26 Conversion section
27 Conveying device
28 Heating jacket chamber and combustion chamber
70 Support stand
A Process sequence
A1 Oil separator
A2 separator
B Process sequence
C Cracking reactor
D Depolymerisation
E Ring zone
F Char/oil separator
G1 Gas scrubber
G2 Gas scrubber
G3 Gas scrubber
R1 Main reactor
R2/14 Conversion section
R3 Secondary reactor
V Circulation evaporator
W1 Heat
W2 Heat
W3 Heat
W5 Heat
Z Separator
a1 anisotropic material mixture
a2 oil-containing material
b1 downwardly directed material flow
b2 concentrically directed material flow
b3 upwardly conveyed mass flow
c1 conveyed flow with carbon
c2 mass flow
d gas/vapour mixture
e gas flow
f gas flow
f2 gas flow
g condensed components
h condensed components
i condensed components
j1 carbonaceous mixture
j2 water with noxious substances and carbon
j3 vapour containing noxious substances
j4 water containing noxious substances
k organic vapour component
l oil-containing vapours
m low-boiling component
n material flow with water-soluble noxious substances
o material flow with water-soluble noxious substances
p waste water
q mass flow overflow
r oil-soluble substances
s oil-soluble substances
t oil-soluble substances
u product gas mixture
v carbon
w1 indirectly supplied heat
w2 indirectly supplied heat
w3 indirect heating W3
x oil
y1 steam
y2 mass flow
z1 permanent gas
z2 carbon oxide-containing vapour mixtures

The invention claimed is:

1. A method for producing synthetic products, which are produced from solid and liquid hydrocarbons, into a gas/vapour mixture and a carbonaceous material by thermal action and catalysis, wherein:

a first process comprising processes that in a main reactor, in a conversion section, in a secondary reactor and in a cracking reactor, effectuate a chemical conversion of materials, and in a second process, comprising oil capture and conditioning processes, a capture of noxious substance components, a char/oil capture and separation, a gas scrubbing, a circulation evaporation, and a mixing and separation of materials is carried out, in the first process, hydrocarbons undergo a multistage depolymerisation reaction and a cracking reaction in the main reactor and also in a subsequent gas/vapour reaction in the conversion section and in the secondary reactor and in the second process produced substances undergo fractionated condensation, purification, separation, evaporation, mixing and conditioning, wherein components produced are conducted through processes of one or both of the first and second processes in cycles, in the main reactor in the first process, an anisotropic material mixture in form of a fill is fed into a carbonaceous mixture, and wherein steam, a carbon oxide-containing vapour mixture, a permanent gas, an oil-soluble substance, an organic vapour component, an oil, carbon and a product gas mixture are introduced and undergo an indirect heating via a heat module in a heating process, the anisotropic material mixture comprises particles and is mechanically separated, and in a downwardly directed material flow of a cracking reaction, and wherein evaporation is combined with a production of a concentrically directed material flow, which is carried out, as a result of which a high energy quantity per unit area passes into a core zone, an upwardly conveyed mass flow of the core zone, in which core zone depolymerisation primarily takes place, is heated with previously heated particles and with simultaneous indirect heat transfer through an inner register and compressed and relaxed in a pulsating manner, the downwardly directed material flow and an additional mass flow, which is conducted via a heat transfer register, in which an indirect heat supply takes place via the heat module, are mixed, and wherein the additional mass flow bridges the depolymerisation, the gas/vapour mixture produced in the core zone, by cracking, evaporation and gas reaction, is introduced as the additional mass flow into a conversion process in the conversion section, and the substances are fed with the downwardly directed material flow and the additional mass flow of an equilibrium reaction in the conversion section to a conveyed material flow with carbon of a char bed.

2. The method according to claim 1, wherein in the conveyed material flow with carbon, in a produced high-temperature char bed, an equilibrium reaction is carried out as a reduction process with heating in the heat module, in which char bed oil-soluble substances with noxious substances contained therein are introduced, which oil-soluble substances are fed from a separating processes oil separator and a char/oil separator and wherein a separating and evaporation process occurs in a circulation evaporator.

3. The method according to claim 1, wherein a low-boiling component from a char/oil separator conducted via a separating and evaporation process in a circulation evaporator and a catalytic cracking process in the cracking reactor is fed as the organic vapour component into a ring zone and to the downwardly directed material flow.

4. The method according to claim 1, wherein the gas reaction is in the gas/vapour mixture in a plurality of reaction zones arranged in a cascade in the conversion section and in the secondary reactor in the char bed with the conveyed material flow with carbon with the addition of the permanent gas, the oil-soluble substance and a noxious substance and the steam as oxygen suppliers for gas production, for the chemical conversion of oil-soluble noxious substances and for a chemical conversion of high-boiling hydrocarbons and a gas reaction is conducted, so that in the char bed of the reaction zones in the conversion section and in the secondary reactor gas flows are produced with fractions of vaporous hydrocarbons from components of the gas/vapour mixture.

5. The method according to claim 1, wherein in gas scrubbers of the second process, gas flows are scrubbed and vapour components undergo fractionated condensation by setting a temperature of scrubbing media of the gas scrubbers, which is undertaken through a mass flow overflow and heat dissipation in the heat module.

6. The method according to claim 1, wherein a low-boiling component of a separation process in a char/oil separator conducted via a catalytic cracking process in the cracking reactor is fed into a ring zone of the main reactor as the organic vapour component in order to increase an evaporation speed on a particle surface of the anisotropic material mixture.

7. The method according to claim 1, wherein a separating process is further conducted in a char/oil separator through heating in the heat module of an upper separator zone and simultaneous horizontal conveyance of media in a lower separator zone under an effect of gravitation and a differing solubility of substances in condensed components from a gas scrubber with a heavy oil component and an entrained char component and a substance flow with a water-soluble noxious substance of an aqueous component with oil contained therein and oil-soluble noxious substances are mixed together, dissolved in one another and then separated by controlling media quantities and also producing and setting a phase boundary, in such a manner that a material flows the oil as a low-boiling component, the oil not readily dissolved with noxious substances and char suspension as an oil-soluble substance and water with char as the carbonaceous mixture and water with noxious substances and carbon, are separated from one another and discharged, wherein the water absorbs salts, is drained off and then introduced separately from a solid component into the gas scrubber, and wherein the solid component is fed as the carbonaceous mixture to the anisotropic material mixture and liquid organic components are conducted back into the secondary reactor as oil-soluble substances.

8. The method according to claim 1, wherein through a separating process in a char/oil separator, a hydrocarbon component is dechlorinated and a heavy hydrocarbon component fed from a gas scrubber with a density of water, which contains char dust as a solid, and a light oil component fed from the second process, which is lighter than water and in which noxious substances and solubilizers for oil and water in a form of quinoid and phenolic systems are contained, are mixed and fed to a reaction process in the secondary reactor.

9. The method according to claim 1, wherein in an upper region of the core zone at temperatures below 500° C. and under the conditions, dechlorination takes place and vapours thereby produced jointly in the steam are discharged into the gas scrubbing.

10. The method according to claim 2, wherein in gas scrubbers of the second process, gas flows are scrubbed and vapour components undergo fractionated condensation by setting a temperature of scrubbing media of the gas scrubbers, which is undertaken through a mass flow overflow and heat dissipation in the heat module.

11. The method according to claim 3, wherein in gas scrubbers of the second process, gas flows are scrubbed and vapour components undergo fractionated condensation by setting a temperature of scrubbing media of the gas scrubbers, which is undertaken through a mass flow overflow and heat dissipation in the heat module.

12. The method according to claim 2, wherein a low-boiling component of a separation process in a char/oil separator conducted via a catalytic cracking process in the cracking reactor is fed into a ring zone of the main reactor as the organic vapour component in order to increase an evaporation speed on a particle surface of the anisotropic material mixture.

13. The method according to claim 2, wherein a separating process is further conducted in a char/oil separator through heating in the heat module of an upper separator zone and simultaneous horizontal conveyance of media in a lower separator zone under an effect of gravitation and a differing solubility of substances in condensed components from a gas scrubber with a heavy oil component and an entrained char component and a substance flow with a water-soluble noxious substance of an aqueous component with oil contained therein and oil-soluble noxious substances are mixed together, dissolved in one another and then separated by controlling media quantities and also producing and setting a phase boundary, in such a manner that a material flows the oil as a low-boiling component, the oil not readily dissolved with noxious substances and char suspension as an oil-soluble substance and water with char as the carbonaceous mixture and water with noxious substances and carbon, are separated from one another and discharged, wherein the water absorbs salts, is drained off and then introduced separately from a solid component into the gas scrubber, and wherein the solid component is fed as the carbonaceous mixture to the anisotropic material mixture and liquid organic components are conducted back into the secondary reactor as oil-soluble substances.

14. The method according to claim 2, wherein through a separating process in a char/oil separator, a hydrocarbon component is dechlorinated and a heavy hydrocarbon component fed from a gas scrubber with a density of water, which contains char dust as a solid, and a light oil component fed from the second process, which is lighter than water and in which noxious substances and solubilizers for oil and water in a form of quinoid and phenolic systems are contained, are mixed and fed to a reaction process in the secondary reactor.

15. The method according to claim 2, wherein in an upper region of the core zone at temperatures below 500° C. and under the conditions, dechlorination takes place and vapours thereby produced jointly in the steam are discharged into the gas scrubbing.

* * * * *